(12) United States Patent
Matsumoto

(10) Patent No.: US 7,756,061 B2
(45) Date of Patent: Jul. 13, 2010

(54) MOBILE ROUTER DEVICE AND HOME AGENT DEVICE

(75) Inventor: Taisuke Matsumoto, Yokohama (JP)

(73) Assignee: Panasonic Corporation, Osaka (JP)

( * ) Notice: Subject to any disclaimer, the term of this patent is extended or adjusted under 35 U.S.C. 154(b) by 716 days.

(21) Appl. No.: 10/570,370

(22) PCT Filed: Jan. 7, 2005

(86) PCT No.: PCT/JP2005/000106

§ 371 (c)(1),
(2), (4) Date: Mar. 2, 2006

(87) PCT Pub. No.: WO2005/069557

PCT Pub. Date: Jul. 28, 2005

(65) Prior Publication Data

US 2006/0274670 A1 Dec. 7, 2006

(30) Foreign Application Priority Data

Jan. 14, 2004 (JP) ............................. 2004-006597

(51) Int. Cl.
*H04L 12/28* (2006.01)
(52) U.S. Cl. ..................... 370/254; 370/331; 370/381; 370/338; 709/227; 709/228; 709/238
(58) Field of Classification Search ................. 370/254, 370/351, 331, 328, 392, 355, 354, 338, 386, 370/389, 395.31, 401, 409; 709/202, 227, 709/228, 238, 242
See application file for complete search history.

(56) References Cited

U.S. PATENT DOCUMENTS

| | | | | |
|---|---|---|---|---|
| 6,959,341 | B1 * | 10/2005 | Leung | 709/250 |
| 7,209,978 | B2 * | 4/2007 | Thubert et al. | 709/242 |
| 2003/0018810 | A1 * | 1/2003 | Karagiannis et al. | 709/238 |
| 2003/0117965 | A1 | 6/2003 | Markki et al. | |

(Continued)

FOREIGN PATENT DOCUMENTS

JP 11-68871 3/1999

(Continued)

OTHER PUBLICATIONS (PCT/EP2003/006209) Method and Apparatus for Route Optimisation in Nested Mobile Networks, Dec. 31, 2003, Janneteau etl. WIPO.*

(Continued)

*Primary Examiner*—Pankaj Kumar
*Assistant Examiner*—Anez Ebrahim
(74) *Attorney, Agent, or Firm*—RatnerPrestia

(57) ABSTRACT

In a home agent device, a message reception unit receives a request of deleting a registration of a mobile router device which has become in a non-connection state, a binding cache registration deletion reception unit judges that it is for deleting a mobile router device which is not a transmission source, and if a mobile router device of the transmission source has the authority of deleting the registration of the target mobile router device, a proxy deletion reception judgment unit deletes the registration of the requested mobile router, therefore, it can be prevented that packets are transmitted to the mobile router device which has become in the non-connection state.

12 Claims, 15 Drawing Sheets

U.S. PATENT DOCUMENTS

| | | | |
|---|---|---|---|
| 2004/0156374 A1* | 8/2004 | Lee et al. | 370/401 |
| 2005/0041634 A1* | 2/2005 | Aura | 370/351 |
| 2006/0050628 A1* | 3/2006 | Ng et al. | 370/216 |
| 2007/0064654 A1* | 3/2007 | Heller | 370/331 |
| 2007/0104170 A1* | 5/2007 | Leung et al. | 370/338 |

FOREIGN PATENT DOCUMENTS

| | | |
|---|---|---|
| JP | 2003-018192 | 1/2003 |
| JP | 2003-158540 | 5/2003 |
| JP | 2004-120322 | 4/2004 |

OTHER PUBLICATIONS

Yumiba, Hideaki et al., "A Study on Concatenated Mobility Management"; Technical Report of IEICE. IN2000-177;Feb. 13, 2001; pp. 7-14 (w/English Abstract).

V. Devarapalli et al., "Network Mobility (NEMO) Basic Support Protocol"; Network Working Group, Standards Track; Jan. 2005; pp. 1-33.

International Search Report corresponding to International Application No. PCT/JP2005/000106 dated Jan. 7, 2005.

* cited by examiner

FIG.7A

| HOME ADDRESS (701) | CARE-OF ADDRESS (702) | PREFIX (703) | VALID TIME (704) |
|---|---|---|---|
| 1::3 | 2::3 | 4::/64 | 600 |
| 1::4 | 3::4 | 4::/64 | 600 |
| ⋮ | ⋮ | ⋮ | ⋮ |

FIG.7B

| HOME ADDRESS | CARE-OF ADDRESS | PREFIX | VALID TIME |
|---|---|---|---|
| 1::3 (705) | 2::3 (706) | 4::/64 | 600 |

FIG.7C

| HOME ADDRESS | CARE-OF ADDRESS | PREFIX | VALID TIME |
|---|---|---|---|
| 1::3 | 2::3 | 4::/64 | 500 |
| 1::4 (707) | 3::4 (708) | 4::/64 | 600 |

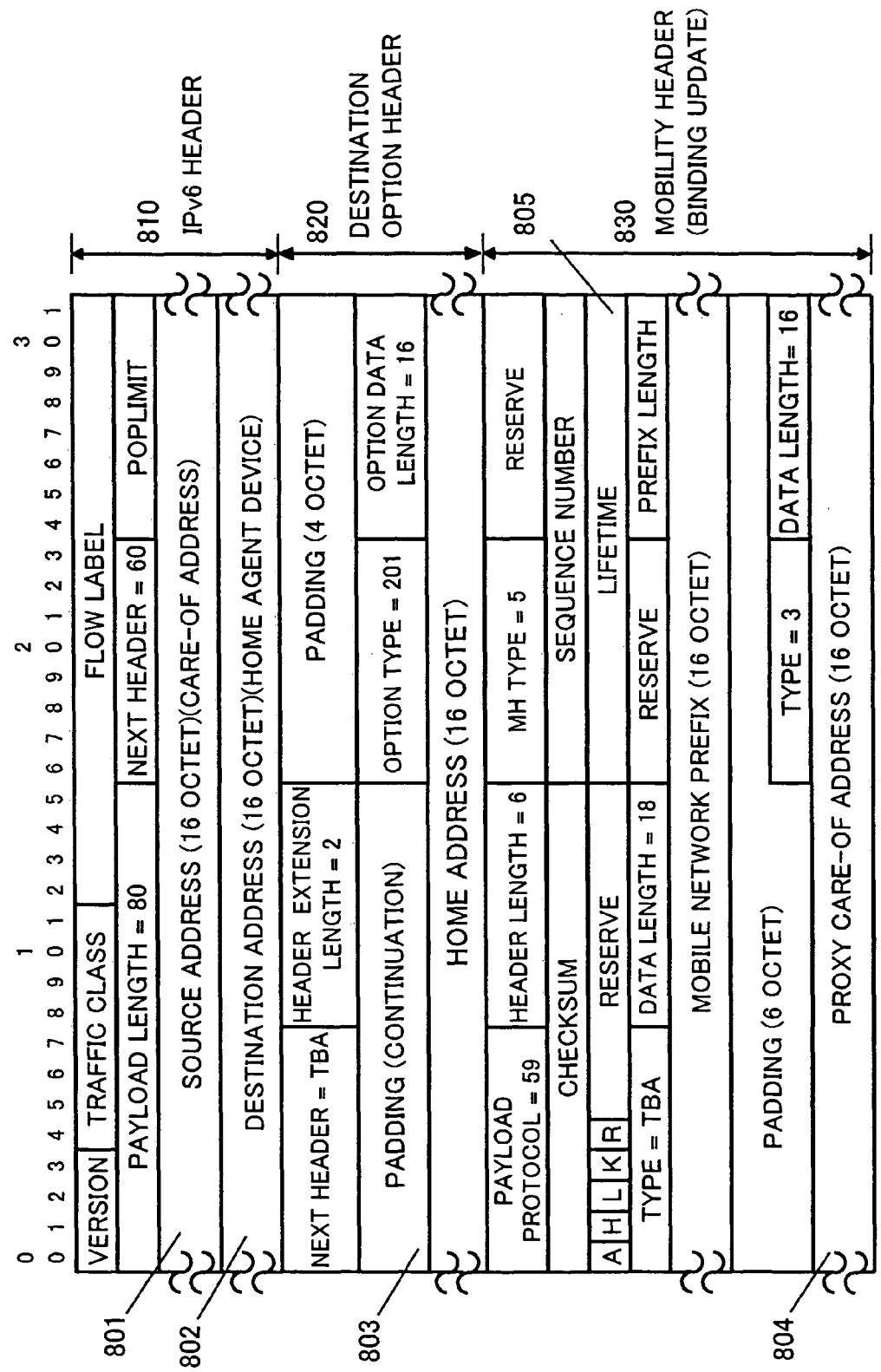

MOBILE ROUTER DEVICE AND HOME AGENT DEVICE

This application is a U.S. national phase application of PCT International application PCT/JP2005/000106 dated Jan. 7, 2005.

TECHNICAL FIELD

The present invention relates to an address management technology managing addresses of a mobile router device on a mobile network, which moves between plural networks.

BACKGROUND ART

Conventionally, as a mobile router device and a home agent device, for example, there exist the ones as disclosed in a specification of U.S. Patent Application No. 2003-0117965. FIG. 15 shows a configuration of a communication network including the conventional mobile router device and the home agent device disclosed in the specification of U.S. Patent Application No. 2003-0117965.

In FIG. 15, a mobile router device (MR) 1801 and a mobile node (MN) 1802 leave a home link 1805 in a state of forming a mobile network 1811 and are connected to a foreign link 1808. Then, the mobile router device (MR) 1801 generates a care-of address based on a router advertisement message (hereinafter, written as "RA message") received from an access router device (AR) 1807 on the foreign link 1808.

Next, the mobile router device 1801 trades a binding update message (hereinafter, written as "BU message") and the like with a home agent device (HA) 1804, and the home agent device 1804 creates a binding cache. Further, the home agent device 1804 creates a bi-directional tunnel between the home agent device 1804 and the mobile router device 1801.

After the bi-directional tunnel is created, the mobile router device 1801 transmits routing information to the home agent device 1804. Then, the home agent device 1804 interprets the routing information and multicasts the routing information to the home link 1805.

Accordingly, a packet addressed to the mobile node (MN) 1802 from a correspondent node (CN) 1810 connecting to an internet 1809 are relayed from a router 1806 on the home link 1805 to the home agent device 1804, and further, transferred to the mobile router device 1801 using the bi-directional tunnel.

Then, the mobile router device 1801 relayed the transferred packet to the mobile node 1802 in the mobile network 1811.

Hereupon, a data configuration of an NEMO binding update message is shown in FIG. 8, which is disclosed in an IETF Mobile IP WG internet draft "Network Mobility (NEMO) Basic Support Protocol". Note that the NEMO binding update message is formed by extending a mobile IPv6 binding update message disclosed in an IETF Mobile IP WG internet draft "Mobility Support in IPv6".

In FIG. 8, when transmitted from the mobile router device 1801 in a movement destination to the home agent device 1804, a care-of address of the mobile router device 1801 is set in a source address 801, and a global address of the home agent device 1804 is set in a destination address 802. And a home address of the mobile router device 1801 is set in a home address 803 of a destination option header. Further, the care-of address of the mobile router device 1801 is set in a proxy care-of address 804 of a mobility header, and valid time of these information is set in units of seconds in a lifetime 805.

The home agent device 1804 registers the care-of address in the binding cache, associating it with the home address of the mobile router device 1801 based on these information. FIG. 7A is a binding cache table showing a data structure of information registered in the binding cache.

In FIG. 7A, according to a home address 701, a registered mobile router device is specified, and associated with a care-of address 702 in the foreign link where the mobile router is currently located. Further, a prefix 703 showing a network address unit of a mobile network to which the mobile router device belongs and a valid time 704 showing available duration of the mobile router device are registered, being associated with the home address 701.

However, when the mobile router device 1801 is replaced with another mobile router device, it is necessary that the BU message in which "0" is set in the lifetime 805 is sent to the home agent device 1804 from the previously used mobile router device 1801 to delete data registered in the binding cache. However, the mobile router device 1801 can not send the BU message to the home agent device 1804 when it has already cut the connection to the foreign link. Thus, the home agent device continues sending messages addressed to the mobile node which was previously under the mobile router device 1801 to the mobile router device 1801 in accordance with information registered in the binding cache until the time which has been set in the lifetime 805 has passed. However, the mobile router device 1801 is not connected to the foreign link 1808, the transmitted packets do not reach the mobile node 1802 and vanish.

DISCLOSURE OF THE INVENTION

An object of the invention is to provide a mobile router device and a home agent device, in which a registration in a binding cache of the home agent device can be updated immediately when the mobile router device connecting to a foreign link of a movement destination is replaced.

The mobile router device of the present invention includes a reception unit receiving a request for deleting a registration from the mobile router device which has been registered in the binding cache of the home agent device and a BC registration deleting request unit requesting the home agent device to delete the registration of the mobile router device on receipt of the received request.

According to the above, the request of a proxy deletion from another mobile router in the same mobile network can be transmitted to the home agent.

In addition, the mobile router device of the invention includes a network connection management unit detecting a connection state with an external link in the mobile router device other than itself, which is connected to the same internal link and a proxy deleting request unit requesting the home agent device to delete the registration of the mobile router device when the network connection management unit detects a non-connection state with the external link in the mobile router device other than itself.

According to the above, the proxy deletion can be requested to the home agent device without receiving the request of registration deletion from another mobile router, therefore, another mobile router device does not have to be provided with a particular function for requesting the proxy deletion.

The home agent deice of the present invention includes a message reception unit receiving a request for deleting the registration of the mobile router device from the binding cache, a BC registration deletion reception unit judging whether the deletion request from a first mobile router device is a proxy deletion for deleting the registration of a second mobile router device or not, and a proxy deletion reception judgment unit judging whether the first mobile router has been registered in advance as the one having the authority of deleting the registration of the second mobile router device or not, and the BC registration deletion reception unit deletes the registration of the second mobile router device from the binding cache in the case that the deletion request is the proxy deletion and the first mobile router device has the authority of the proxy deletion.

According to the above, only the proxy deletion request from the previously authorized mobile router is received and the registration of the designated mobile router device can be deleted, therefore, the registration deletion of the mobile router device with malicious intent can be prevented.

Additionally, the home agent device of the invention includes a key/authentication storage unit previously storing information, associating it with keys performing decryption, which concerns a first mobile router device having the authority of performing a proxy deletion for the registration of a mobile router device other than itself from a binding cache and a second mobile router device to be deleted by proxy, an authentication unit extracting a corresponding key from the key/authentication storage unit based on information of the first mobile router device which is a transmission source of a received encrypted message and the second mobile router device designated by the first mobile router device, a decryption unit decrypting the encrypted message by means of the extracted key and a BC registration deletion reception unit deleting the registration of the second mobile router device from the binding cache in the case that the decrypted message from the first mobile router device is a deletion request for the second mobile router.

According to the above, even when the encrypted communication is performed with the mobile router device, only the request from the mobile router device having the proper authority of the proxy registration deletion can be received.

According to the invention as the above, when the mobile router device connecting to the external link is replaced, it is prevented that the home agent device transmits a packet to the mobile router device in the non-connection state. In addition, the binding cache of the home agent device can be used efficiently.

BRIEF DESCRIPTION OF THE DRAWINGS

FIG. 7A is a table indicating a data configuration of a binding cache of the home agent device according to the embodiment 1 of the invention.

FIG. 7B is a table indicating a data configuration of the binding cache of the home agent device according to the embodiment 1 of the invention.

FIG. 7C is a table indicating a data configuration of the binding cache of the home agent device according to the embodiment 1 of the invention.

FIG. 8 is a chart indicating a format of a binding update message according to the embodiment 1 of the invention.

Figure 1:
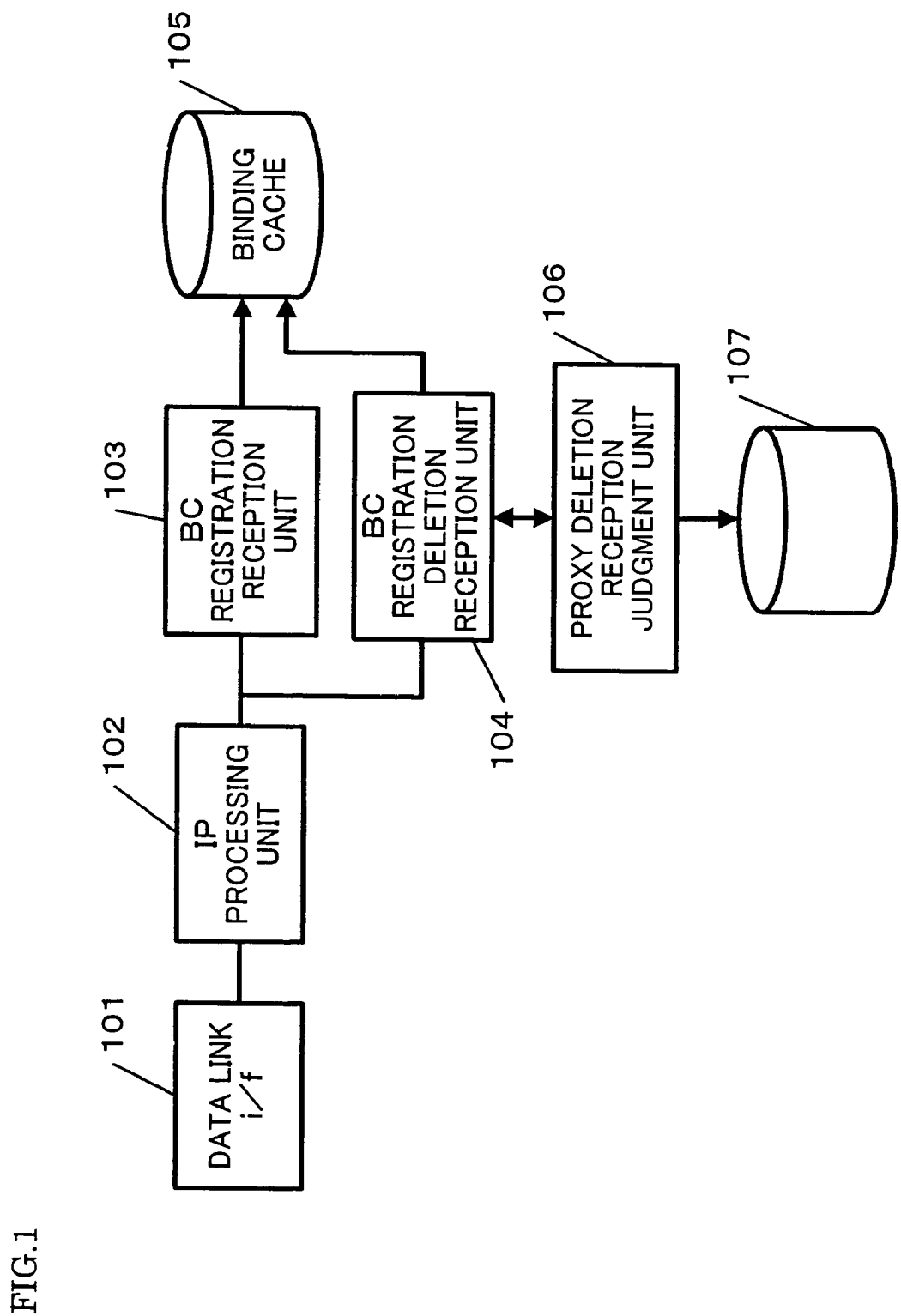
FIG. 1 is a block diagram showing a configuration of a home agent device according to an embodiment 1 of the invention.

DESCRIPTION OF REFERENCE NUMERALS 101 data link interface
102 IP processing unit
103 BC registration reception unit
104 BC registration deletion reception unit
105 binding cache
106 proxy deleting judgment unit
107 proxy deletion MR storage unit
201 external link interface
202 internal link interface
203 IP processing unit
204 network connection judgment unit
205 BC registration request unit
206 BC registration deleting request unit
207 proxy deleting judgment unit
208 MR list storage unit
209 proxy deleting request unit
601, 602, 1801 mobile router device (MR)
603, 1802 mobile node (MN)
604, 1803 internal link
605, 1804 home agent device (HA)
606, 1805 home link
607, 1806 router
608, 610, 1807 access router (AR)
609, 611, 1808 foreign link
612, 1809 internet
613, 1810 correspondent node (CN)
614, 1811 mobile network
1001 network connection management unit
1101 decryption unit
1102 SPI storage unit
1201 encryption unit
1202 key storage unit Best Mode for Carrying Out the Invention Hereinafter, embodiments of the invention will be explained with reference to the drawings.

Embodiment 1

Figure 6:
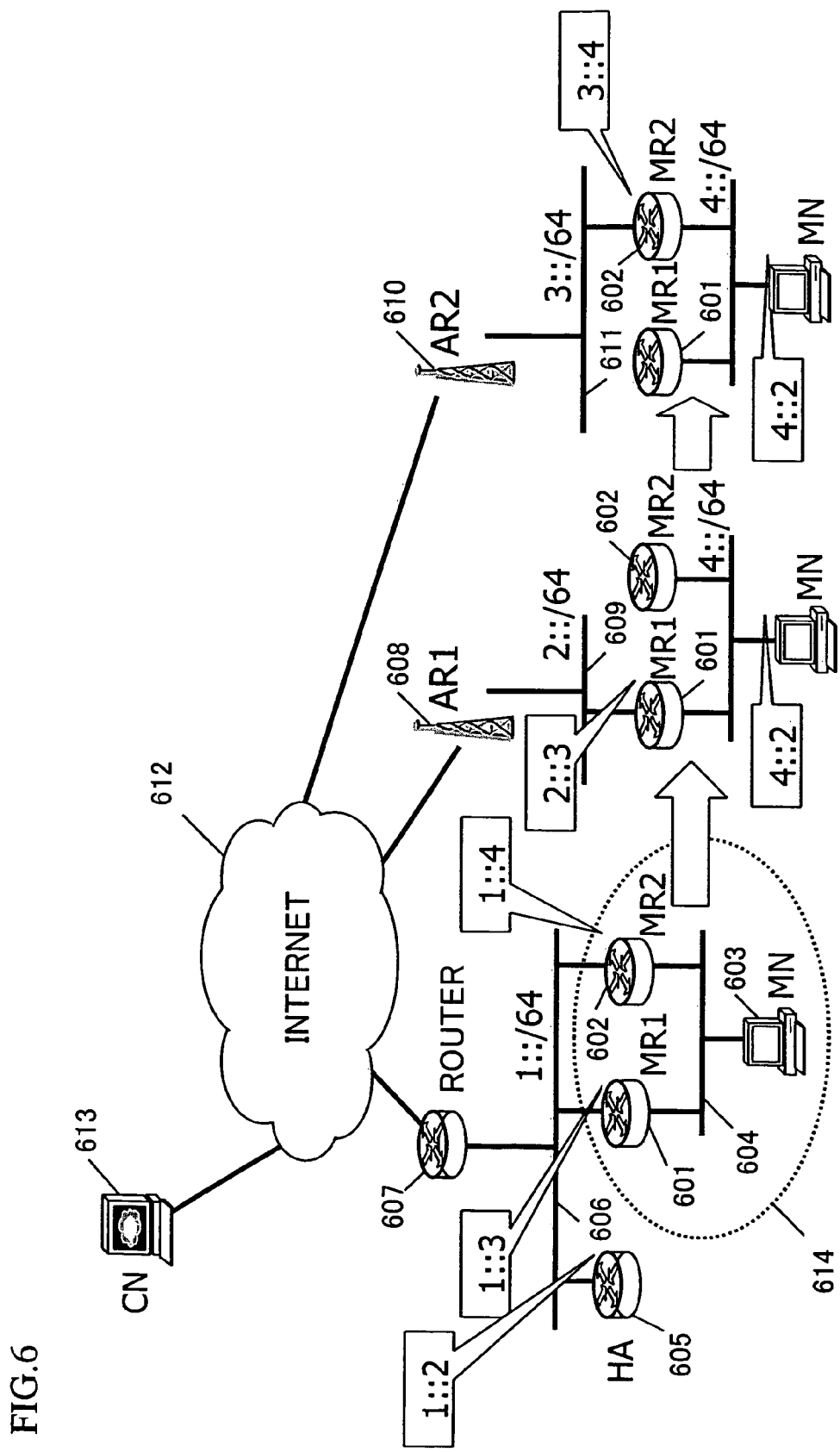
FIG. 6 is a block diagram showing a configuration of a communication network according to the embodiment 1 of the present invention.

The configuration of a communication network according to an embodiment of the invention is shown in FIG. 6.

In FIG. 6, a mobile router device (MR1) 601 and a mobile router device (MR2) 602 form a mobile network 614 with a mobile node (MN) 603 and an internal link 604, connecting to a home link 606 managed by a home agent device (HA) 605. The home link 606 connects to an internet 612 through a router device 607, and communication can be possible with a correspondent node (CN) 613.

Then, the mobile network 614 leaves the home link 606 and connects to a foreign link 609 under an access router (AR1) 608. At this time, the mobile router device (MR1) 601 connects to the foreign link, however, the mobile router device (MR2) 602 does not connect to that.

Further, the mobile network 614 moves and connects to a foreign link 611 under an access router (AR2) 610. At this time, the mobile router device (MR2) 602 connects to the foreign link 611, however, the mobile router device (MR1) 601 does not connect to that. Note that a prefix of the internal link in the mobile network 614 is 4::/64, a prefix of the home link is 1::/64, a prefix of the foreign link under the AR1 is 2::/64, and a prefix of the foreign link under the AR2 is 3::/64. Further, a home address of the mobile router device (MR1) is 1::3, the one of the mobile router device (MR2) is 1::4, and a local address of the MN is 4::2. For the mobile routers MR1, MR2, the home link and foreign links correspond to external links.

First, the configuration and operation of the home agent device and the mobile router device in such mobile communication system will be explained below.

FIG. 1 is a block diagram showing a configuration of the home agent device according to the embodiment of the invention.

In FIG. 1, a data-link interface (data link i/f) 101 performs communication processing in a physical layer and a data-link layer, and an IP processing unit 102 performs IP protocol processing in a network layer. A binding cache 105 is a memory which saves home addresses and care-of addresses of managing mobile router devices, a BC registration reception unit 103 registers the care-of address in the binding cache 105 by associating it with the home address of the mobile router device, which is notified by a BU message from the mobile router device, and a BC registration deletion reception unit 104 deletes the registration of the mobile router device from the binding cache 105 based on information of the BU message from the mobile router device. A proxy deletion MR storage unit 107 stores the mobile router device having the authority of deleting the registration of another mobile router from the binding cache instead of the mobile router to be deleted itself, and a proxy deleting judgment unit 106 judges whether a request is a proxy deletion request from the mobile router device stored in the proxy deletion MR storage nit 107 or not. Note that the data-link interface 101 and the IP processing unit 102 correspond to a message reception unit.

Figure 3:
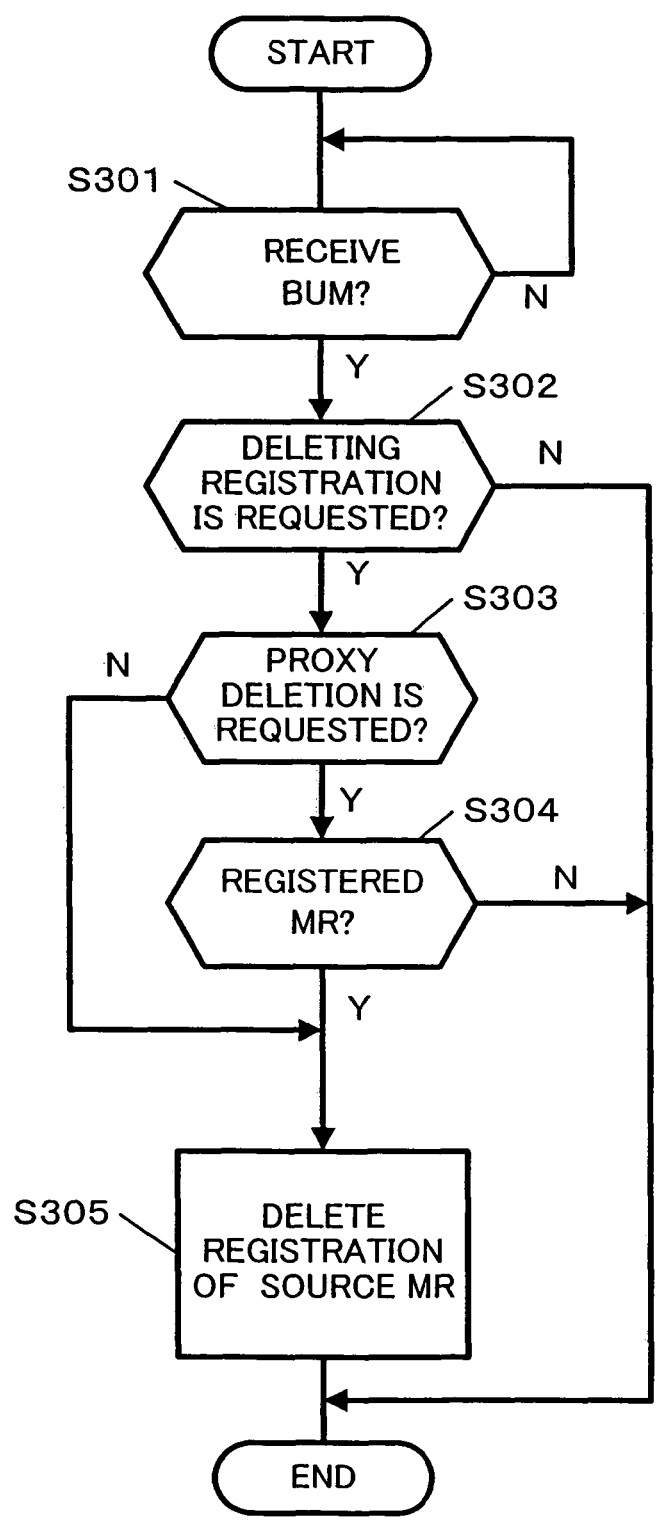
FIG. 3 is a flowchart showing the operation of the home agent according to the embodiment 1 of the present invention.

The operation and effect of the home agent device constructed as described above will be explained below with reference to FIG. 3.

First, the IP processing unit 102 judges whether it has received a BU message (BUM) from the data-link interface 101 or not (step S301), when received, the IP processing unit 102 checks a life time 805, and makes a notification to the BC registration deletion reception unit 104 in the case that the life time 805 is "0" (step S302).

The BC registration deletion reception unit 104 receives the notification and checks that the BU message is a deletion request from a proxy mobile router device (step S303). The judgment whether the proxy deletion request or not is performed based on whether a source address 801 of a BU message IPv6 header corresponds to a proxy care-of address 804 of a mobility header shown in FIG. 8. In the case that the proxy care-of address 804 corresponds to the source address 801, the BC registration deletion reception unit 104 judges that a request source is the mobile router device itself to be deleted from the binding cache, and deletes information concerning the mobile router device of the request source from the binding cache 105 (step S305).

On the other hand, the BC registration deletion reception unit 104, when judging that the deletion request is the one from a proxy mobile router, instructs the proxy deleting judgment unit 106 to check whether the mobile router device of the request source has qualification of the proxy deletion or not. The proxy deleting judgment unit 106 receives the instruction, then, judges whether the mobile router device which is intended for the deletion is stored in the proxy deletion MR storage unit 107, and whether the mobile router device of the transmission source of the BU message is stored as the mobile router device which has authority of deleting the target mobile router device (step S304). If stored, the proxy deleting judgment unit 106 notifies the BC registration deletion reception unit 104 accordingly, and the BC registration deletion reception unit 104 deletes information of the mobile router device of which deletion is requested from the binding cache 105 (step S305). If not stored in the proxy deletion MR storage unit 107, the processing ends without deleting information of the mobile router device of which deletion is requested.

According to the above, the home agent device deletes the mobile router device which has become in a non-connection state from the binding cache by the proxy deletion request of the mobile router device registered in advance.

The processing of the proxy deletion reception by the limited mobile router device is not essential, however, it is effective for preventing improper deletion of registration of another mobile router, or preventing the registration deletion with malicious intent.

Next, the configuration of the mobile router device according to the embodiment of the invention will be explained below with reference to FIG. 2.

Figure 2:
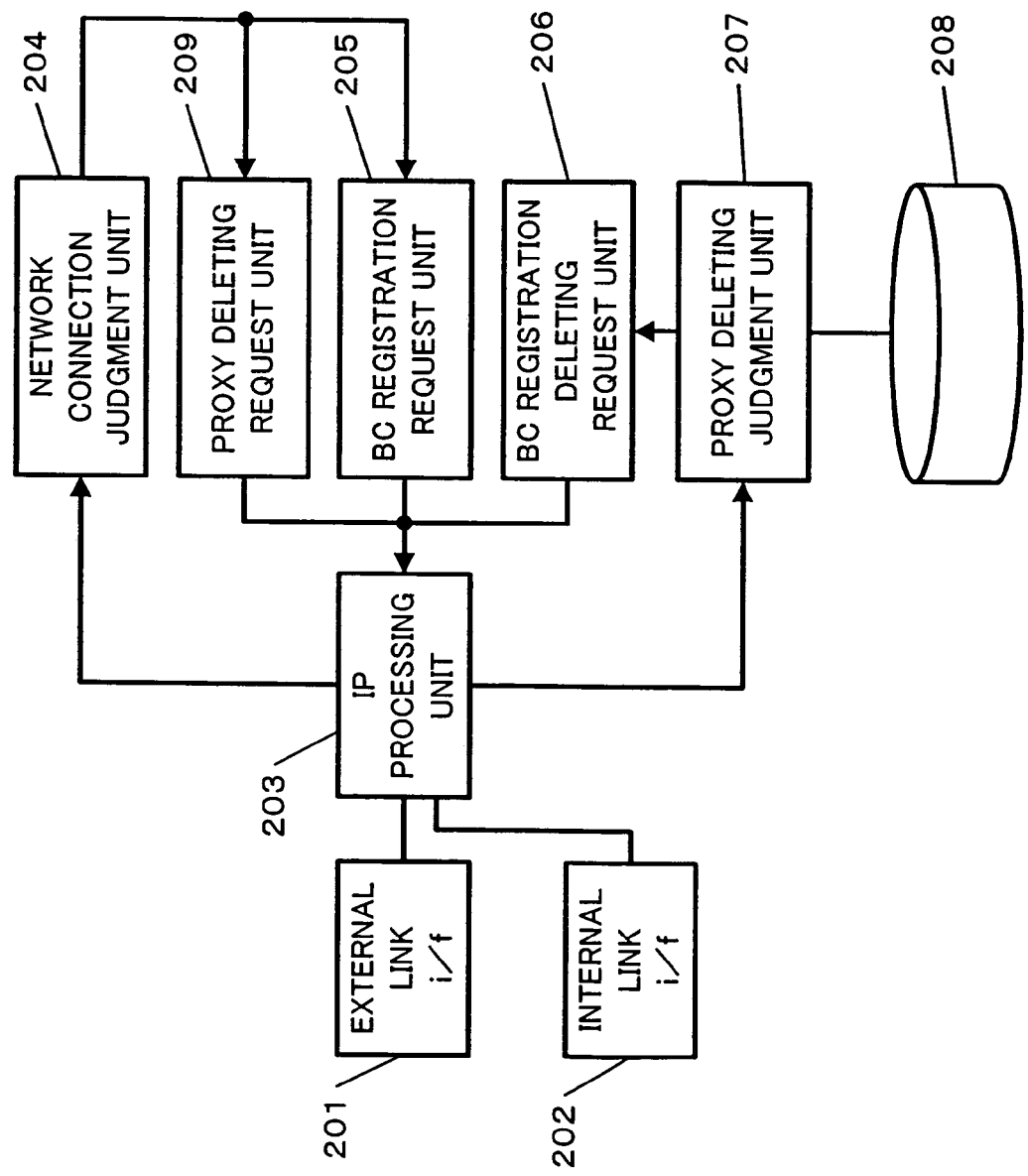
FIG. 2 is a block diagram showing a configuration of a mobile router device according to the embodiment 1 of the present invention.

In FIG. 2, an external link interface (external link i/f) 201 performs communication processing in the physical layer and the data-link layer connecting to the home link and the foreign link, and an internal link interface (internal link i/f) 202 performs communication processing in the physical layer and the data-link layer connecting to the internal link, and an IP processing unit 203 performs IP protocol processing in the network layer. In addition, a network connection judgment unit 204 judges whether it is in the connection state with the external link or the home link, a BC registration request unit 205 instructs the IP processing unit 203 to send a BU message requesting a registration of information of itself in the binding cache to the home agent device, and a BC registration deleting request unit 206 instructs the IP processing unit 203 to send a BU message requesting the deletion of information of designated mobile router device from the binding cache to the home agent device. And a proxy deleting judgment unit 207 judges whether the mobile router device which has asked the home agent device to request the proxy deletion is stored in a MR list storage unit 208 or not. A proxy deleting request unit 209 asks another mobile router device set in advance to send a request of deleting the registration of itself from the home agent. Note that the external link interface 201, the internal link interface 202 and the IP processing unit 203 correspond to the reception unit relating to the invention.

The operation and effect of the mobile router device constructed as described above will be explained below with reference to FIG. 4 and FIG. 5.

First, the IP processing unit 203 checks whether it has received a RA message from the router device 607 through the interface 201 or not, when received, the IP processing unit 203 make a notification to the network connection judgment unit 204 (step S401). The network connection judgment unit 204 generates a care-of address from the information (step S402).

Next, the network connection judgment unit 204 judges whether the care-of address has been notified to the home agent device or not (step S403), when judged that it has been notified, the processing ends. When judged that the registration to the home agent has not been performed yet, the network connection judgment unit 204 instructs the BC registration request unit 205 to make a registration in the binding cache of the home agent device. The BC registration request unit 205 received the instruction and sends the BU message shown in FIG. 8, in which the new care-of address is set to the proxy care-of address, to the home agent device through the external link interface 201 (step S404).

On the other hand, in the step S401, (when/if) the IP processing unit 203 has not received the RA message, the network connection judgment unit 204 judges the non-connection with the external link, because there is no reception notification of RA message from the IP processing unit 203 after the prescribed time has passed (step S401). At this time, the network connection judgment unit 204 judges whether the care-of address of itself has been registered in the binding cache of the home agent device or not (step S405), if not registered, the processing ends. When registered, the network connection judgment unit 204 instructs the proxy deleting judgment unit 207 to send a message requesting another mobile router device connecting to the internal link for a proxy deletion request. On the receipt of the instruction, the proxy deleting request unit 209 sends the request of the proxy deletion from the binding cache of the home agent device to the mobile router device designated in advance, which has the authority of deleting the registration of itself through the internal link interface 202 (step S406).

Next, processing when the proxy request from another mobile router connecting to the internal link has been received will be explained with reference to FIG. 5.

First, the IP processing unit 203 receives a proxy deletion message from another mobile router device through the internal link interface 202 (step S501), then, notifies the reception to the proxy deleting judgment unit 207. The proxy deleting judgment unit 207 judges whether the source address of the proxy deletion message is the mobile router device stored in the MR list storage unit 208 or not (step S502), if not stored, the proxy deleting judgment unit 207 ignores the message.

On the other hand, when the message is sent from the mobile router device stored in the MR list storage unit 208, the proxy deleting judgment unit 207 instructs the BC registration deleting request unit 206 to request the proxy deletion with respect to the home agent device.

On the receipt of the instruction, the BC registration deleting request unit 206 instructs the IP processing unit 203 to send a BU message to the home agent device, in which the care-of address of itself, the address of the home agent device, the home address of itself and the care-of address of the mobile router which has requested the registration deletion from the home agent are respectively set corresponding to the source address 801, the destination address 802, the home address 803, and the proxy care-of address in the BU message shown in FIG. 8, and further "0" is set to the lifetime 805.

On receipt of the instruction, the IP processing unit 203 send the BU message to the home agent device through the external link interface 201 (step S503).

According to the above, the mobile router device can delete the registration of itself from the home agent by requesting another mobile router connecting to the internal link for the proxy deletion when the connection with the external link is cut off.

It is also possible that the mobile router device can delete the registration of the mobile router device of the request source which is in the home agent on receipt of the request of the proxy deletion from another mobile router device connecting to the internal link.

Note that it is not essential for the mobile router device to have both the function of requesting the proxy deletion and the function of receiving the proxy deletion, and the function of receiving the proxy deletion may be limited to the mobile router which has registered in the home agent device in advance.

Next, the operation between each other when plural mobile routers as described above move to the foreign links 609, 611 from the home link 606 as shown in FIG. 6 will be explained below.

First, the home agent device 605 detects that the RA message from the mobile router device (MR1, MR2) is not issued, and recognize that these are not connected to the home link 606.

Next, the mobile router device (MR1) 601 connects to the foreign link 609 and acquires a care-of address (2::3) from the access router (AR1) 608, then, notifies it to the home agent device by means of the BU message. The home agent device 605 generates the binding cache as shown in FIG. 7B, in which a care-of address 706 is registered by associating it with a home address 705 of the mobile router device (MR1). Since the mobile router device MR2 is not connected, it is not registered in the home agent device.

Next, when the mobile network 614 further moves and connects to the foreign link 611, the mobile router device (MR2) acquires a care-of address (3::4) from the AR2. The mobile router device (MR2) notifies it to the home agent device (HA) 605 by means of the BU message. On the receipt of the notification, the home agent device (HA) 605 registers a care-of address 708, associating it with a home address 707 of the mobile router device (MR2) in the binding cache as shown in FIG. 7C.

Then, the mobile router device (MR1) detects that it does not connect to the foreign link, and asks the mobile router device (MR2) for the request of the proxy deletion with respect to the home agent (HA) via the internal link. On receipt of the request, the mobile router device (MR2) requests the home agent device (HA) to delete the registration of the mobile router device (MR1) from the binding cache. The home agent device (HA) receives the request and deletes information of the mobile router device (MR1) from the binding cache.

In the embodiment, the mobile router device (MR2) generates the BU message for the proxy deletion by receiving the request from the mobile router device (MR1), however, it is not limited to that and is also possible that the mobile router device (MR1) send a message having the same format as the BU message to the mobile router device (MR2) through the internal link, then, the mobile router device (MR2) tunnel-forwards the message with an IPv6 header added to it as an encapsulated tunnel packet to the home agent. The message sent from the mobile router (MR1) to the mobile router device (MR2) is explained as follows.

Specifically, 2::3 as the care-of address of the mobile router device (MR2) is set in the source address 801, and 1::2 as the home device is set in the destination address 802. Further, 1::3 is set as the home address 803 in a destination option header, "0" is set in a lifetime 806 in a mobility header, and 2::3 is set in the proxy care-of address 804.

Figure 9A:
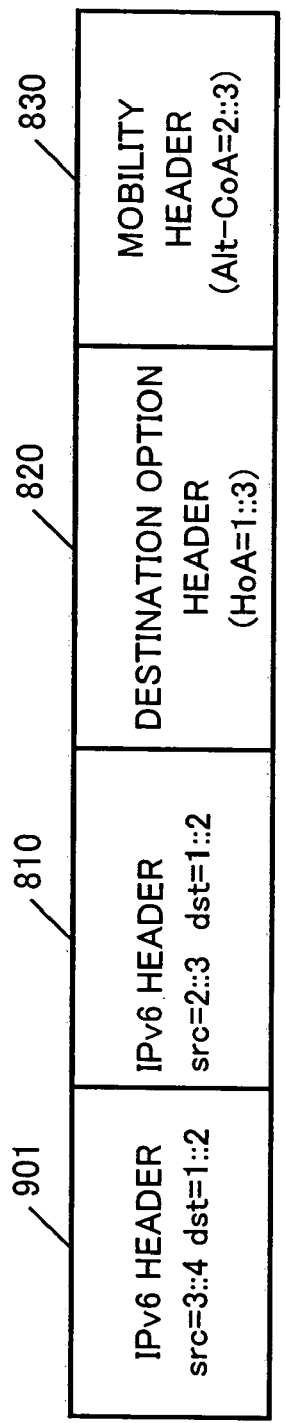
FIG. 9A is a chart indicating another format of the binding update message according to the embodiment 1 of the invention.

The format of the BU message forwarded from the mobile router device (MR2) to the home agent device (HA) by tunneling is the one with an IPv6 header 901 added to it as shown in FIG. 9A, in which the care-of address (3::4) of the mobile router device (MR2) is set in the source address, and the address of the home agent device (HA) (1::2) is set in the destination address. The home agent device which has received the packet analyzes the IPv6 header 901 and judges that the packet has been tunnel-forwarded. Then, the home agent device (HA) removes the outside of the IPv6 header 901. As a result, the home agent device (HA) processes the message as a normal BU message from the mobile router device (MR1) having the care-of address of 2::3, because the destination of the inside of the packet is 1::2 which is the address of the home agent device.

According to the above, the registration of the mobile router device which becomes in the non-connection state can be deleted from the binding cache of the home agent device (HA), therefore, the binding cache of the home agent can be used efficiently and it can be prevented that the home agent device transmits packets to the mobile router device which is in the non-connection state.

In the embodiment, the mobile router device performs the proxy request for the registration deletion to the home agent device by using the BU message, therefore, the mobile router device is not required to use a particular message and is only required to have a normal IPv6 specification.

Embodiment 2

Figure 10:
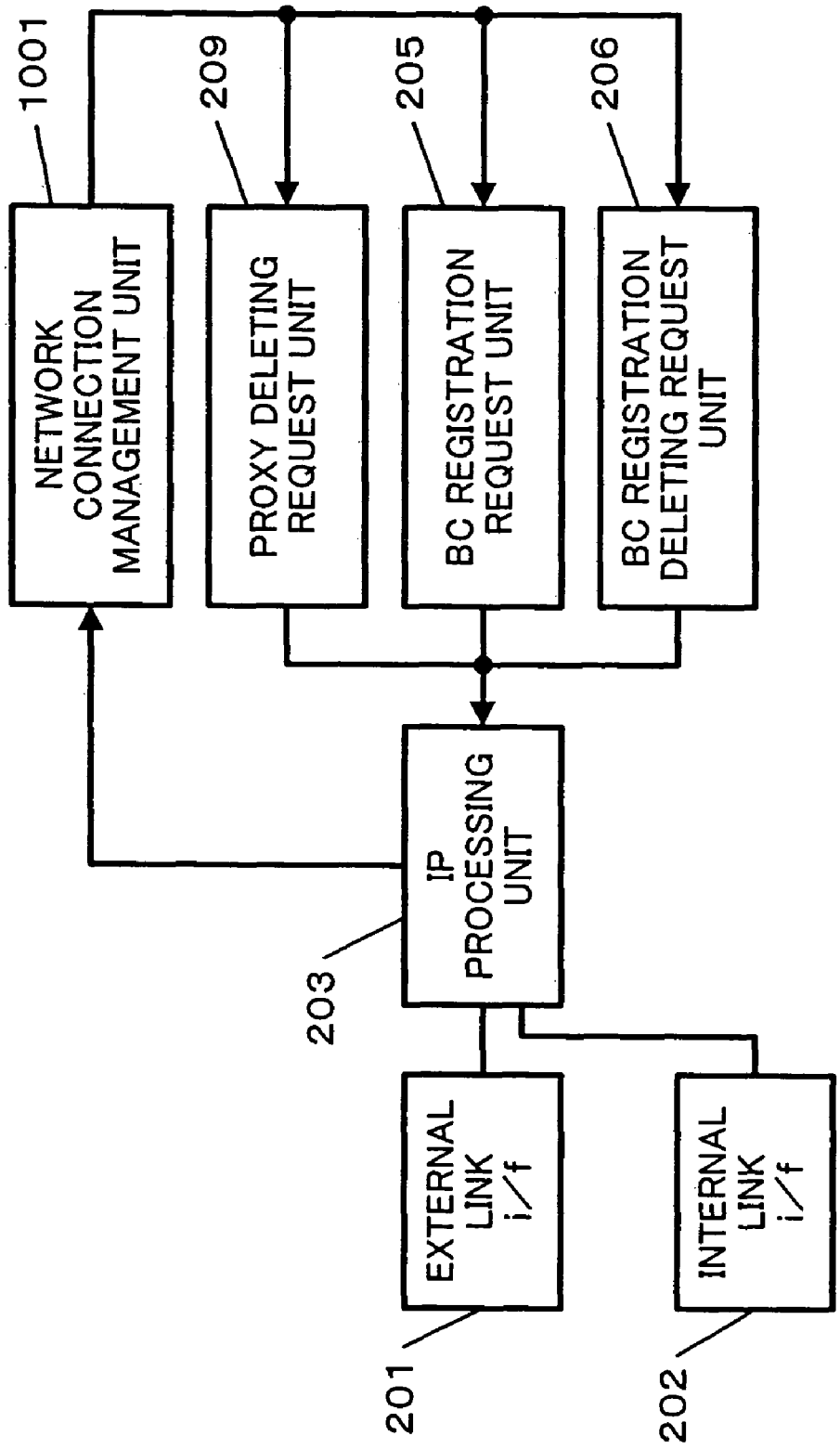
FIG. 10 is a block diagram showing a configuration of a mobile router device according to an embodiment 2 of the invention.

FIG. 10 is a block diagram showing a configuration of a mobile router device according to an embodiment 2 of the invention.

The device is different from the mobile router device in the embodiment 1 at the point of including a network connection management unit 1001 instead of the network connection judgment unit 204 and at the point of not including the proxy deleting judgment unit 207 and the MR list storage unit 208.

Figure 14:
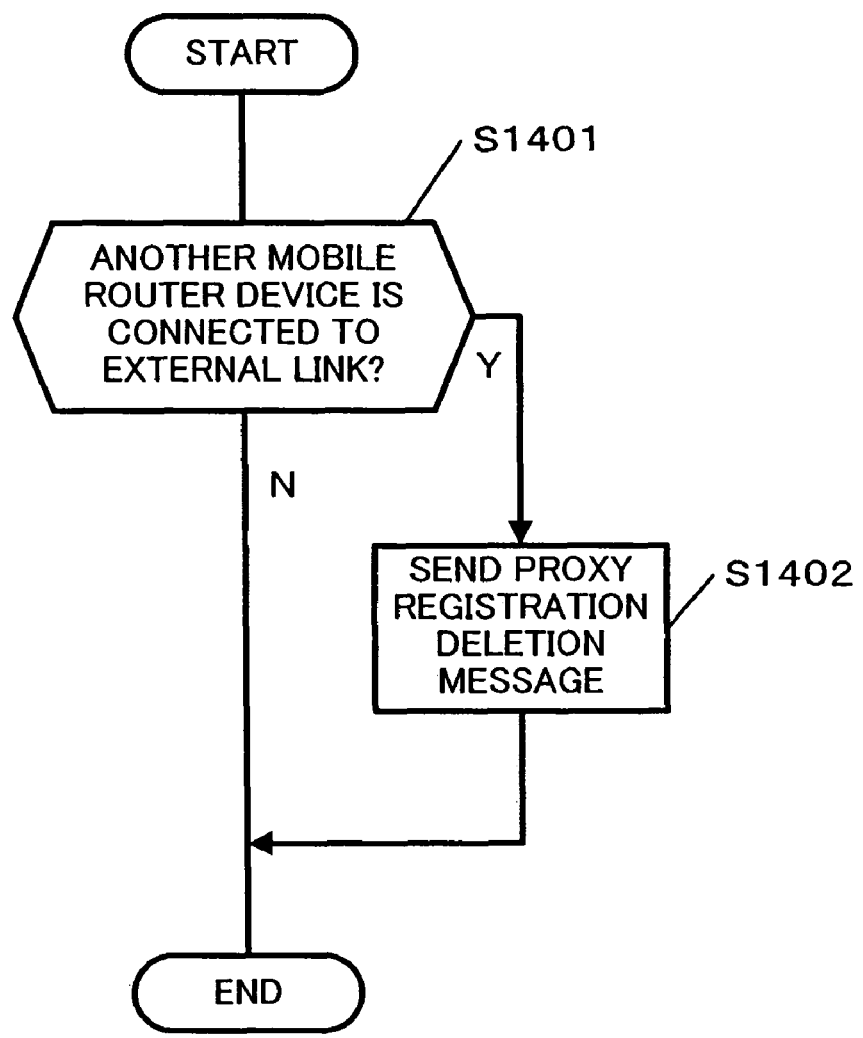
FIG. 14 is a flowchart showing the operation of the mobile router device according to the embodiment 2 of the invention.
Figure 15:
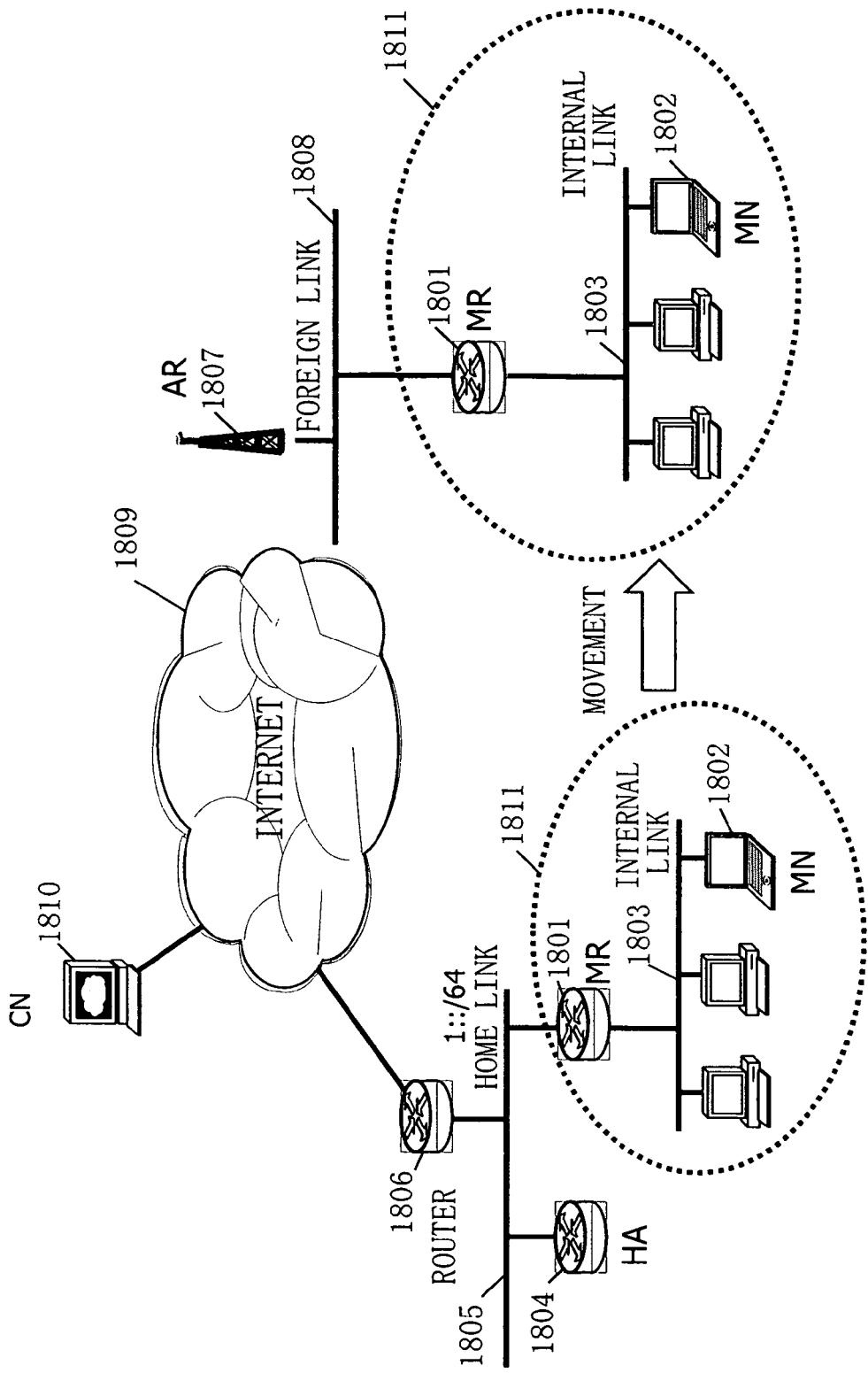
FIG. 15 is a block diagram showing a configuration of a conventional communication network.

FIG. 14 is a flow chart showing the operation of the mobile router device in the embodiment. This FIG. 14 is an alternative of the processing shown in FIG. 5 of the embodiment 1, in which the proxy request is received from the another mobile router device connecting to the same internal link.

In FIG. 14, first, the network connection management unit 1001 watches out for RA messages of the mobile router devices connecting to the same internal link as itself, and detects the mobile router device from which the RA message has not been received after the prescribed time has passed. Then, the network connection management unit 1001 judges that the detected mobile router device has disconnected from the external link and notifies it to the proxy deleting request unit 209 (step S1401).

The proxy deleting request unit 209 receives the notification, and instructs: the IP processing unit 203 to send a BU message of the proxy deletion for deleting the registration of the detected mobile router device from the binding cache of the home agent device in the same way as the embodiment 1.

The operation of the IP processing unit 203 which has received the instruction is the same as the embodiment 1 (step S1402).

Accordingly, the mobile router device of the embodiment can perform the proxy deletion of the mobile router which has connected to the external link to which the mobile router itself is connected, therefore the another mobile router device is not required to have the network connection judgment unit 204 and the proxy deleting request unit 209. In the embodiment, the case of not including the proxy deleting judgment unit 207 and the MR list storage unit 208 is shown, however, it is not limited to that and is also possible that the detected mobile router device is judged whether it is the mobile router device stored in the MR list storage unit 208 or not, and the proxy deletion request is performed only with respect to the stored mobile router device. Consequently, only the specific mobile router device can be deleted by proxy, therefore, it can be prevented that the mobile router of which registration should be maintained is deleted.

In the embodiment, the proxy deletion request with respect to all the mobile routers which become in the non-connection state will be transmitted, however, it is not limited to that and is also possible that only the mobile router device can be deleted by proxy, which has transmitted data other than the RA message just before the connection to the foreign link is cut. Accordingly, only the registration of the mobile router device having the possibility that packets are continuously transmitted from the correspondent node is deleted, therefore, packet loss can be efficiently prevented.

According the above, in FIG. 6, in the case that the mobile router device (MR2) 602 is the mobile router device in the embodiment, the mobile router device (MR1) 601 is not required to request the mobile router device (MR2) 602 for the proxy deletion when the mobile router moves from the foreign link 609 to the foreign link 611.

Furthermore, the mobile router device of the invention detects the connection state by the presence of the RA message sent from another mobile router device, therefore, the mobile router device other than the mobile router which detects the connection state is only required to have a normal IPv6 specification.

Note that the home agent device is the same as the embodiment 1.

Embodiment 3

Figure 11:
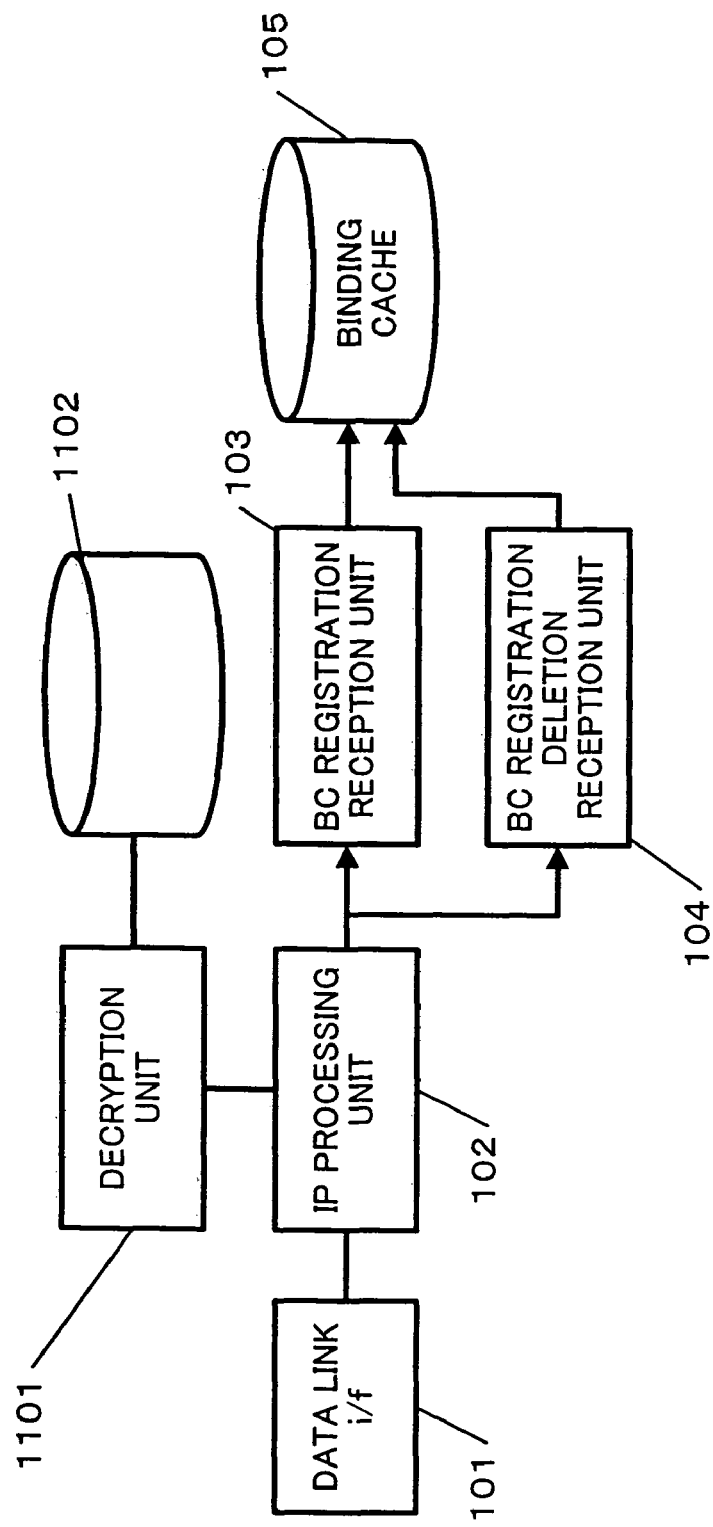
FIG. 11 is a block diagram showing a configuration of a home agent device according to the embodiment 3 of the invention.

FIG. 11 is a block diagram showing a configuration of a home agent device in an embodiment 3 of the invention.

The device is different from the home agent device in the embodiment 1 at the point of including a decryption unit 1101 and a SPI storage unit 1102 and at the point of not including the proxy deleting judgment unit 106 and the proxy deletion MR storage unit 107.

Figure 9B:
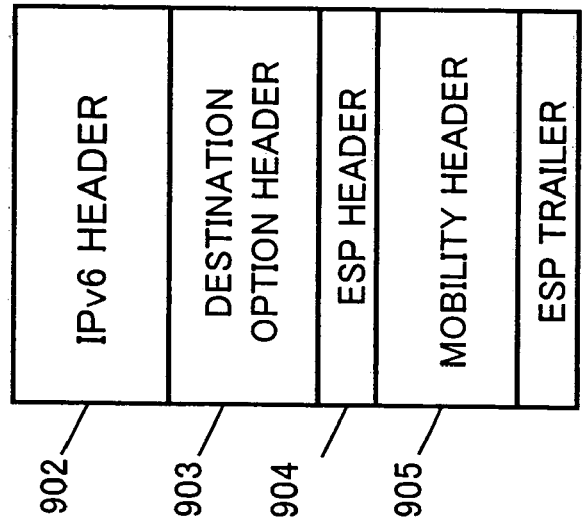
FIG. 9B is a chart indicating an encrypted binding update message according to an embodiment 3 of the invention.

In FIG. 11, the decryption unit 1101 is the unit for communicating with the mobile router device in the transport mode by an IPsec, and decrypts the received encrypted message. A format of the encrypted BU message is shown in FIG. 9B.

The format is prescribed in "draft-ietf-mobileip-ipv6-24.txt", in which a mobility header 905 is encrypted in ESP (Encapsulating Security Payload) for the protection.

The SPI storage unit 1102 corresponds to a key/authentication storage unit, storing keys for decrypting the encryption by associating them with a SPI (Security Parameter Index) which is given to each mobile router device peculiarly and with the home address of the mobile router device of which authority of the proxy deletion belongs to the mobile router corresponding to the SPI.

The decryption unit 1101 corresponds to a authentication unit and a decryption unit according to the invention, and decides the key from the SPI storage unit 1102 based on a destination address of an IPv6 header 902 (the address of the home agent device in the embodiment) and a SPI value included in an ESP header 904. At the same time, the decryption unit 1101 checks whether the home address included in a destination option header 903 is the mobile router device registered in the SPI storage unit 1102 or not, and when it is the home address of the registered mobile router device, the decryption is performed, however, when it is not registered, the decryption is not performed.

Figure 13:
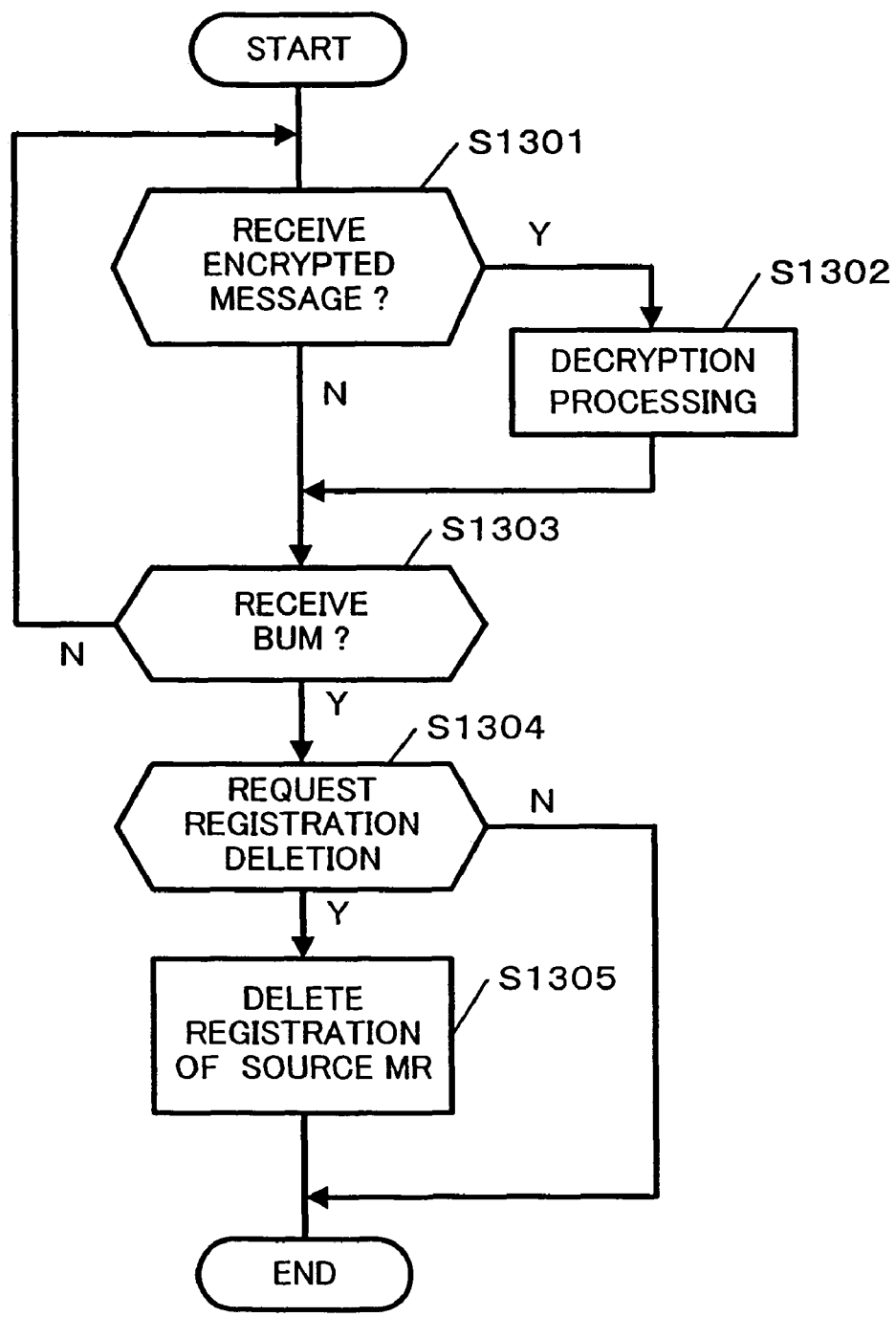
FIG. 13 is a flowchart showing the operation of the home agent device according to the embodiment 3 of the invention.

Next, the operation of the home agent device will be explained with reference to FIG. 13.

First, the IP processing unit 102 judges whether the received message is encrypted one or not (step S1301), when it is not encrypted, the processing proceeds to step S1303. On the other hand, in the case that it is the encrypted message, the IP processing unit 102 instructs the decryption unit 1101 to perform decryption processing. On receipt of the instruction, the decryption unit 1101 decrypts the message and notifies it to the IP processing unit 102 (step S1302).

Next, the IP processing unit 102 judges whether the message is the BU message or not (step S1303), and when it is the BU message requesting for the registration deletion, the IP processing unit 102 notifies it to the BC registration deletion reception unit 104 (step S1304).

Next, on the reception of the notification, in the case that the decrypted message is the request of the proxy deletion from the mobile router other than the mobile router device to be deleted, the BC registration deletion reception unit 104 deletes the registration of the mobile router device of which the deletion is requested, which is registered in the binding cache 105, and deletes the registration of the mobile router of the transmission source in the case that the message is the request for the deletion of the mobile router device itself of the request source (step S1305).

According to the above, the home agent device can perform the proxy deletion using the BU message after judging the advisability for the proxy deletion by the encrypted key.

Figure 12:
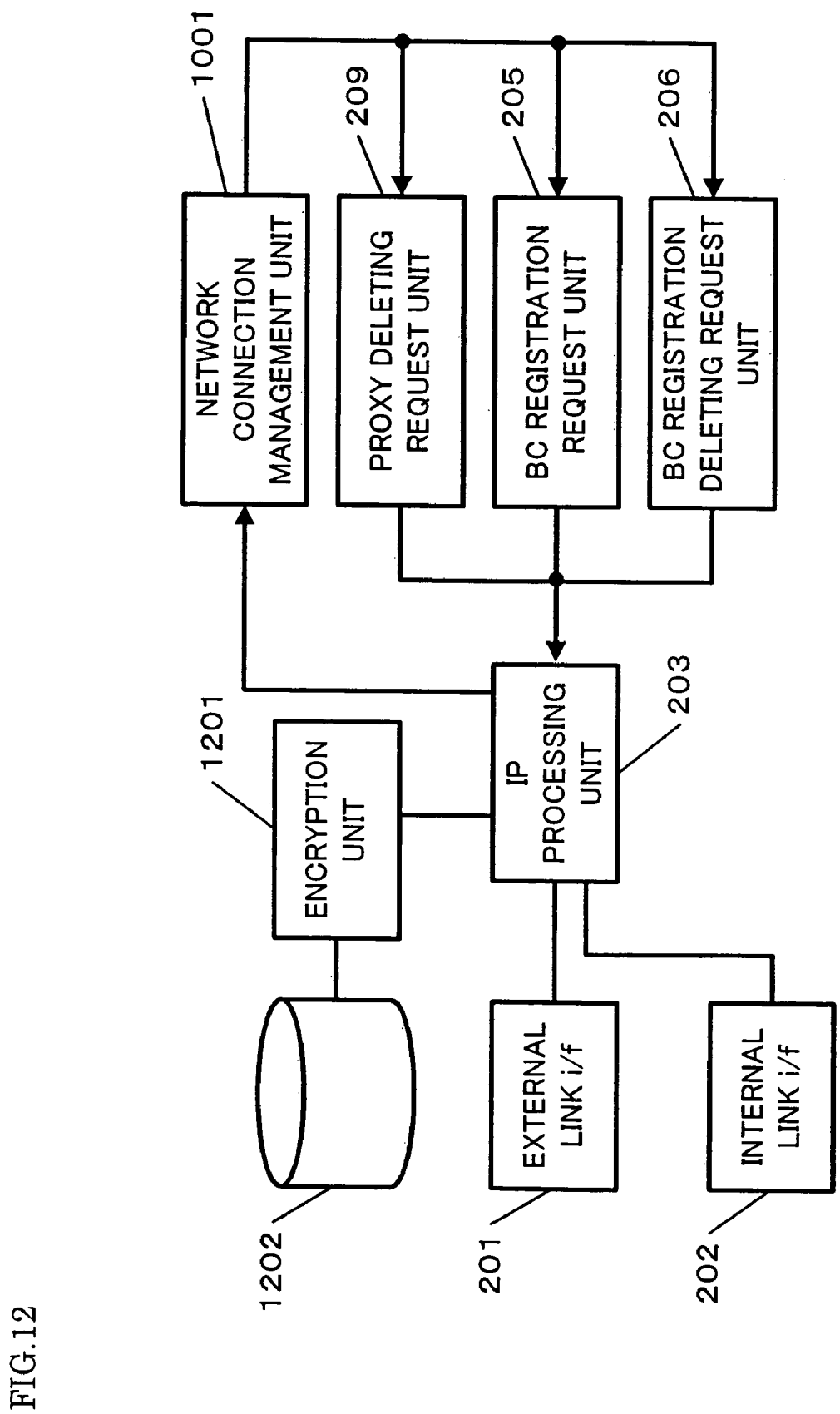
FIG. 12 is a block diagram showing a configuration of a mobile router device according to the embodiment 3 of the invention.

Next, the mobile router device in the embodiment will be explained. FIG. 12 is a block diagram showing a configuration of a mobile router device in the embodiment 3 of the invention.

It is different from the mobile router device in the embodiment 2 shown in FIG. 10 at the point of including an encryption unit 1201 and a key storage unit 1202.

In FIG. 12, the encryption unit 1201 encrypts the BU message formed in the IP processing unit 203 using a key stored in the key storage unit 1202 as described above. The key used at the time is same as the one stored in the SPI storage unit 1102 of the home agent device.

Figure 4:
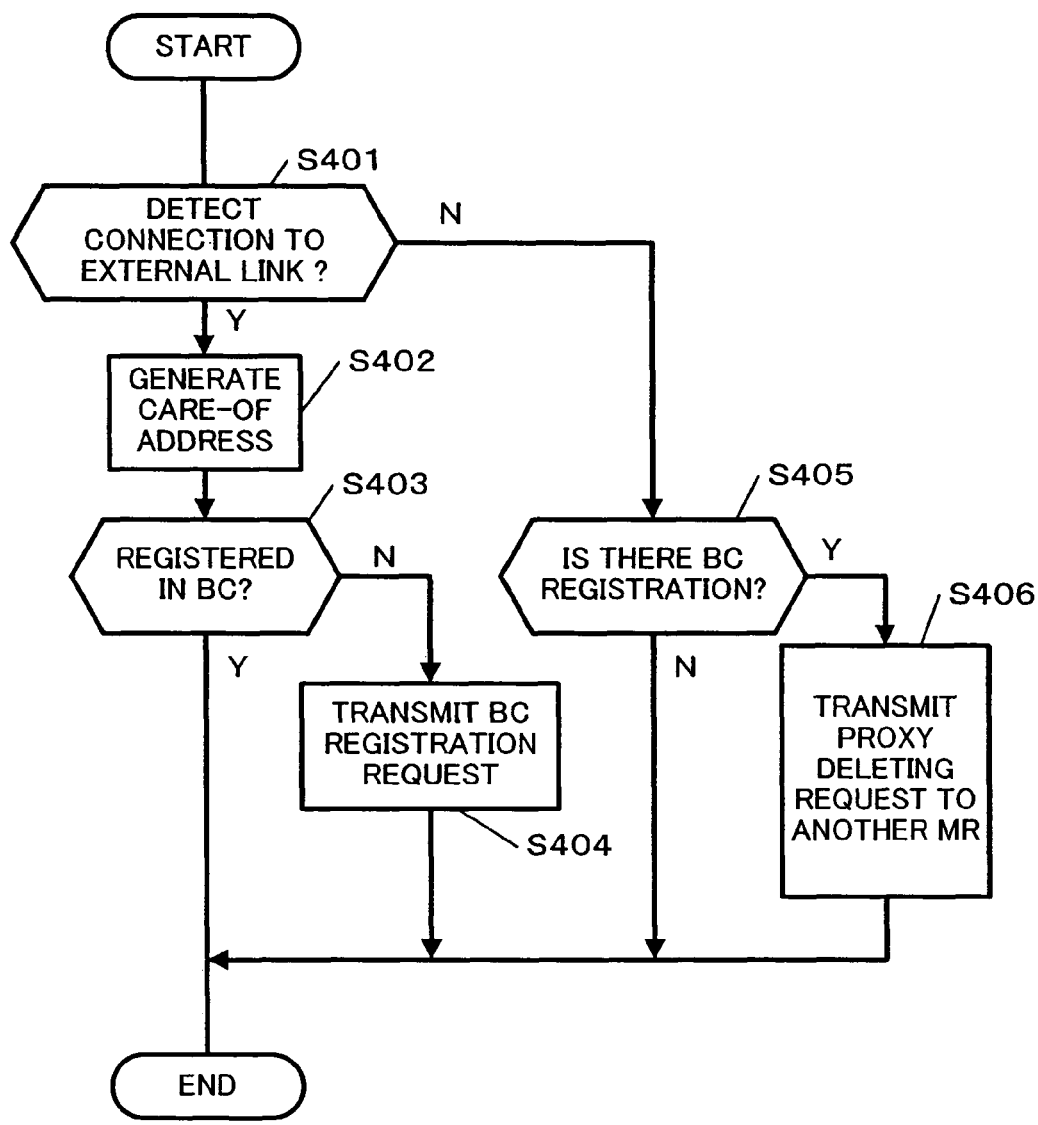
FIG. 4 is a flowchart showing the operation of the mobile router device according to the embodiment 1 of the present invention.
Figure 5:
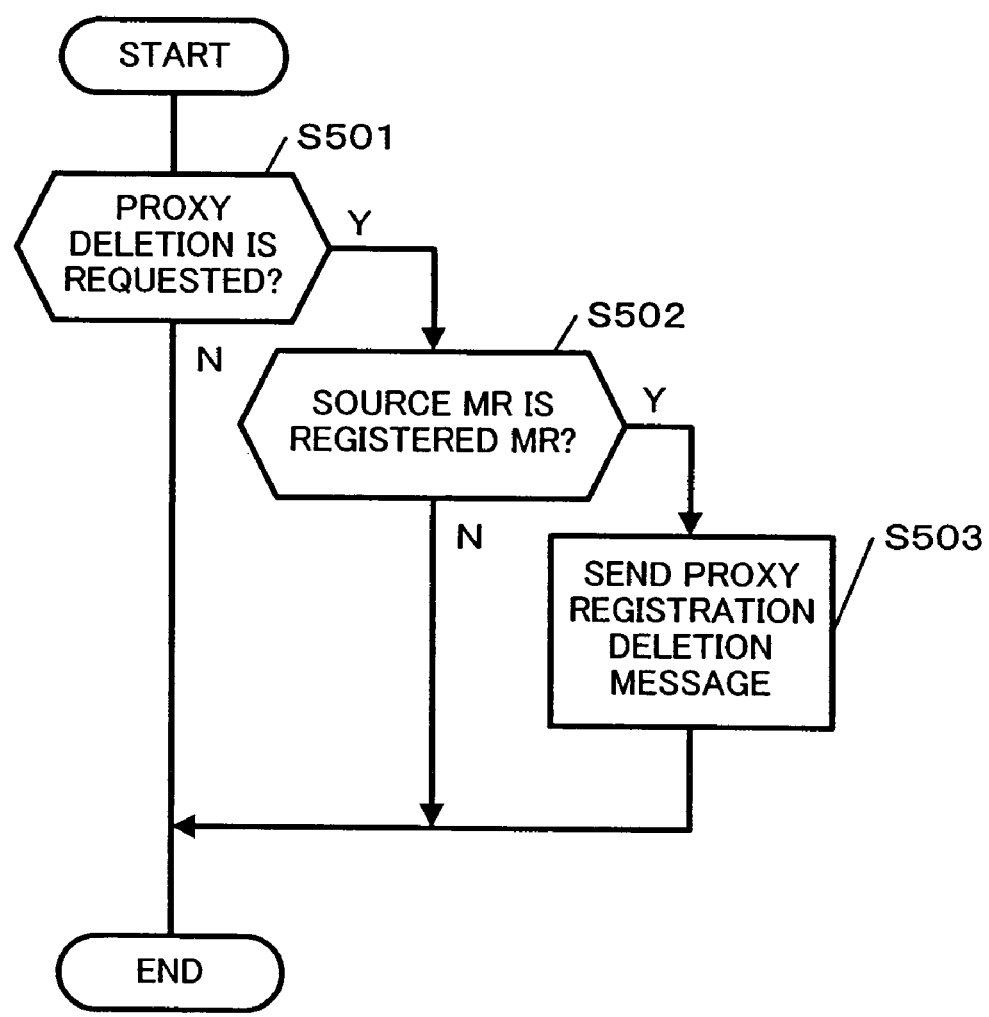
FIG. 5 is a flowchart showing the operation of the home agent according to the embodiment 1 of the present invention.

The operation of the mobile router device is same as the embodiment 2 except that the BU message of the BC registration request is encrypted when transmitted at the step S404 in FIG. 4 and that the proxy registration deletion message is encrypted when transmitted at the step S503 in FIG. 5.

By using the above home agent device and the mobile router device, even when the mobile network moves while the encrypted communication is performed between each other, the registration of the mobile router device which is in the non-connection state can be deleted from the binding cache of the home agent device (HA) in the same way as the embodiment 1. Accordingly, the binding cache of the home agent device can be efficiently used and it is prevented that the home agent device transmits packets to the mobile router device which is in the non-connection state.

INDUSTRIAL APPLICABILITY

The present invention is useful for a mobile router device constituting a mobile network which moves between plural networks and a home agent device accommodating the mobile router devices, and preferable for an address management when replacing the mobile router device connecting to an external link.

The invention claimed is:

1. A mobile router device, comprising:
a mobile router reception unit for receiving a first request from an other mobile router device for deleting a registration of the other mobile router device which has been registered in a binding cache of a home agent device, the mobile router device and the other mobile router device forming a mobile network, the mobile network leaving or having lea a home link and connecting to a foreign link, the other mobile router device not connecting to the foreign link; and
a judgment unit for judging whether the first request has been made from the other mobile router device which has been previously registered; and
a binding cache registration deleting request unit for providing a second request to the home agent device to delete the registration of the other mobile router device on receipt of the first request, when the other mobile router device has been previously registered and ignoring the first request, when the other mobile router device has not been previously registered.

2. The mobile router device according to claim 1, wherein said binding cache registration deleting request unit provides said second request to delete the registration of the other mobile router when receiving a notification from said judgment unit, that the first request is sent from the registered mobile router device.

3. A mobile router device, comprising:
a mobile router network connection management unit detecting a connection state to an external link in an other mobile router device other than itself, which connects to the same internal link;
a reception unit for receiving a first request from the other mobile router device for deleting a registration of the other mobile router device in a binding cache of a home agent device, the mobile router device and the other mobile router device forming a mobile network, the mobile network leaving or having left a home link and connecting to the external link, the other mobile router device not connecting to the external link; and
a judgment unit for judging whether the first request has been made from the other mobile router device which has been previously registered; and
a proxy deleting request unit for: (1) providing a second request to the home agent device to delete a registration of the other mobile router device when (i) said network connection management unit detects a non-connection state to the external link in the other mobile router device other than itself, and (ii) the other mobile router device has been previously registered; and (2) ignoring the first request when the other mobile router device has not been previously registered.

4. The mobile router device according to claim 3, wherein the detection of the connection state is performed by a presence of a router advertisement message transmitted from another mobile router device.

5. The mobile router device according to claim 1, wherein the second request of deleting the registration is performed by a binding update message designating a home address of the other mobile router device of which registration is deleted.

6. The mobile router device according to claim 2, wherein the second request of deleting the registration is performed by a binding update message designating a home address of the other mobile router device of which registration is deleted.

7. The mobile router device according to claim 3, wherein the second request of deleting the registration is performed by a binding update message designating a home address of the mobile router device of which registration is deleted.

8. The mobile router device according to claim 4, wherein the second request of deleting the registration is performed by a binding update message designating a home address of the mobile router device of which registration is deleted.

9. A home agent device comprising:
 a message reception unit receiving a deletion request for deleting a registration of a first mobile router device from a binding cache of the home agent device;
 a binding cache registration deletion reception unit judging whether the deletion request from a second mobile router device is a proxy deletion for deleting the registration of the first mobile router device when the first mobile router device detects a non-connection state to an external link; and
 a proxy deletion reception judgment unit judging whether the second mobile router device has been previously registered as one having authority of deleting the registration of the first mobile router device,
 wherein said binding cache registration deletion reception unit deletes the registration of the first mobile router device from the binding cache of the home agent device if the deletion request is the proxy deletion and the second mobile router device has the authority.

10. A home agent device comprising:
 a home agent device key/authentication storage unit previously storing information, associating the information with keys performing decryption, which concerns a first mobile router device having authority of performing a proxy deletion for a registration of a second mobile router device other than itself from a binding cache of the home agent device and the second mobile router device to be deleted by proxy responsive to a non-connection state of the second mobile router device to an external link is detected;
 an authentication unit extracting a corresponding key from said key/authentication storage unit based on information of the first mobile router device which is a transmission source of a received encrypted message and the second mobile router device designated by the first mobile router device;
 a decryption unit decrypting the encrypted message by the extracted key;
 a proxy deletion reception judgment unit judging whether the first mobile router device has been previously registered as one having authority of deleting the registration of the second mobile router device; and
 a binding cache registration deletion reception unit deleting the registration of the second mobile router device from the binding cache of the home agent device if the decrypted message from the first mobile router device is a deletion request for the second mobile router device and the first mobile router device has the authority of deleting the registration of the second mobile router device.

11. The home agent device according to claim 9, wherein the deletion request is a binding update message designating a home address of the first mobile router device.

12. The home agent device according to claim 10, wherein the deletion request is a binding update message designating a home address of the second mobile router device.

* * * * *

UNITED STATES PATENT AND TRADEMARK OFFICE
CERTIFICATE OF CORRECTION

PATENT NO. : 7,756,061 B2
APPLICATION NO. : 10/570370
DATED : July 13, 2010
INVENTOR(S) : Taisuke Matsumoto It is certified that error appears in the above-identified patent and that said Letters Patent is hereby corrected as shown below:

In the claims:

At Column 12, line 21, claim 1 "having lea a home link" should read --having left a home link--

Signed and Sealed this

Thirtieth Day of November, 2010

David J. Kappos
*Director of the United States Patent and Trademark Office*